United States Patent
Sagar Ramachandra et al.

(10) Patent No.: US 12,353,865 B2
(45) Date of Patent: Jul. 8, 2025

(54) EFFICIENT FIRMWARE DOWNLOAD OPERATION IN STORAGE DEVICES

(71) Applicant: SAMSUNG ELECTRONICS CO., LTD., Suwon-si (KR)

(72) Inventors: Pradeep Sagar Ramachandra, Bengaluru (IN); Suresh Vishnoi, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 18/155,714

(22) Filed: Jan. 17, 2023

(65) Prior Publication Data

US 2024/0152342 A1 May 9, 2024

(30) Foreign Application Priority Data

Nov. 7, 2022 (IN) .............................. 202241063483

(51) Int. Cl.
*G06F 8/61* (2018.01)
*G06F 21/57* (2013.01)

(52) U.S. Cl.
CPC .............. *G06F 8/63* (2013.01); *G06F 21/572* (2013.01); *G06F 2221/033* (2013.01)

(58) Field of Classification Search
CPC ........................................................ G06F 8/63
USPC ........................................................ 717/178
See application file for complete search history.

(56) References Cited

U.S. PATENT DOCUMENTS

| | | | |
|---|---|---|---|
| 8,219,794 B1* | 7/2012 | Wang ...................... | G06F 8/656 713/1 |
| 8,375,064 B2* | 2/2013 | Jaquette ............... | H03M 13/096 713/193 |
| 8,819,190 B2* | 8/2014 | Pafumi ..................... | G06F 8/63 709/208 |
| 9,916,151 B2* | 3/2018 | Ye .......................... | H04W 12/10 |
| 9,940,123 B1* | 4/2018 | Ayoub ................ | G06F 13/4295 |
| 10,705,759 B2* | 7/2020 | Nelogal ................ | G06F 3/0659 |
| 10,884,624 B2* | 1/2021 | Lai ............................. | G06F 8/66 |

(Continued)

OTHER PUBLICATIONS

Kim, Kyusik, and Taeseok Kim. "HMB in DRAM-less NVMe SSDs: Their usage and effects on performance." PloS one 15.3 (2020).*

(Continued)

*Primary Examiner* — Francisco J Aponte
(74) *Attorney, Agent, or Firm* — MORGAN, LEWIS & BOCKIUS LLP

(57) ABSTRACT

A system for a firmware image download operation in a storage device includes a storage device controller that performs the firmware image download operation in the storage device. A dedicated host memory buffer (HMB) within a HMB stores a firmware image. Further, re-ordering or sorting of an address list mapped to the firmware image that is not in sequence is performed while the firmware image is in the dedicated HMB. Another system for a firmware image download operation in a storage device includes a driver of the host that performs the firmware image download operation in the storage device. A dedicated HMB within a HMB is used for the chunks of the firmware image that are not in sequence. Further, sorting an address list mapped to the firmware image that are not in sequence is performed while the chunks of the firmware image are in the dedicated HMB.

9 Claims, 6 Drawing Sheets

(56) References Cited

U.S. PATENT DOCUMENTS

| | | | |
|---|---|---|---|
| 11,789,716 B2* | 10/2023 | Yamaoka | G06F 21/572 |
| | | | 717/169 |
| 12,050,533 B2* | 7/2024 | Lee | G06F 12/0875 |
| 12,073,204 B2* | 8/2024 | Ramaiah | G06F 8/65 |
| 2014/0189673 A1* | 7/2014 | Stenfort | G06F 8/654 |
| | | | 717/170 |
| 2017/0046152 A1* | 2/2017 | Shih | G06F 11/0727 |
| 2017/0090911 A1* | 3/2017 | Hathorn | G06F 8/654 |
| 2017/0235567 A1 | 8/2017 | Marino et al. | |
| 2018/0188986 A1* | 7/2018 | Webster | G06F 3/0637 |
| 2018/0293065 A1* | 10/2018 | Hathorn | H04L 47/626 |
| 2018/0321854 A1* | 11/2018 | Lai | G06F 3/0632 |
| 2019/0087172 A1* | 3/2019 | Lappi | G06F 16/27 |
| 2019/0278586 A1* | 9/2019 | Olarig | G06F 8/654 |
| 2019/0361695 A1* | 11/2019 | Gore | G06F 9/44589 |
| 2021/0157560 A1* | 5/2021 | Orozco | G06F 8/60 |
| 2022/0091750 A1* | 3/2022 | Kang | G06F 8/65 |
| 2022/0357937 A1* | 11/2022 | Tav | G06F 8/61 |
| 2023/0229481 A1* | 7/2023 | Warkentin | G06F 9/4401 |
| | | | 718/1 |
| 2024/0004641 A1* | 1/2024 | Mavungal Noorudheen | |
| | | | G06F 8/654 |

OTHER PUBLICATIONS

Zalivaka, Siarhei S., and Alexander A. Ivaniuk. "NAND Flash Memory Devices Security Enhancement Based on Physical Unclonable Functions." Frontiers of Quality Electronic Design (QED) AI, IoT and Hardware Security. Cham: Springer International Publishing, 2022.*

Extended European Search Report dated Mar. 21, 2024 in corresponding European Patent Application No. 23154243.2, 19 pages.

Lenny Tom et al., "Flash Memory Summit 2014, Santa Clara, CA," Jul. 21, 2016 (Jul. 21, 2016), pp. 1-91 XP093086428, Retrieved From the Internet.

NVMExpress: NVM Express Revision 1.2.1, Jun. 5, 2016 (Jun. 5, 2016), XP055749076, Retrieved From the Internet.

* cited by examiner

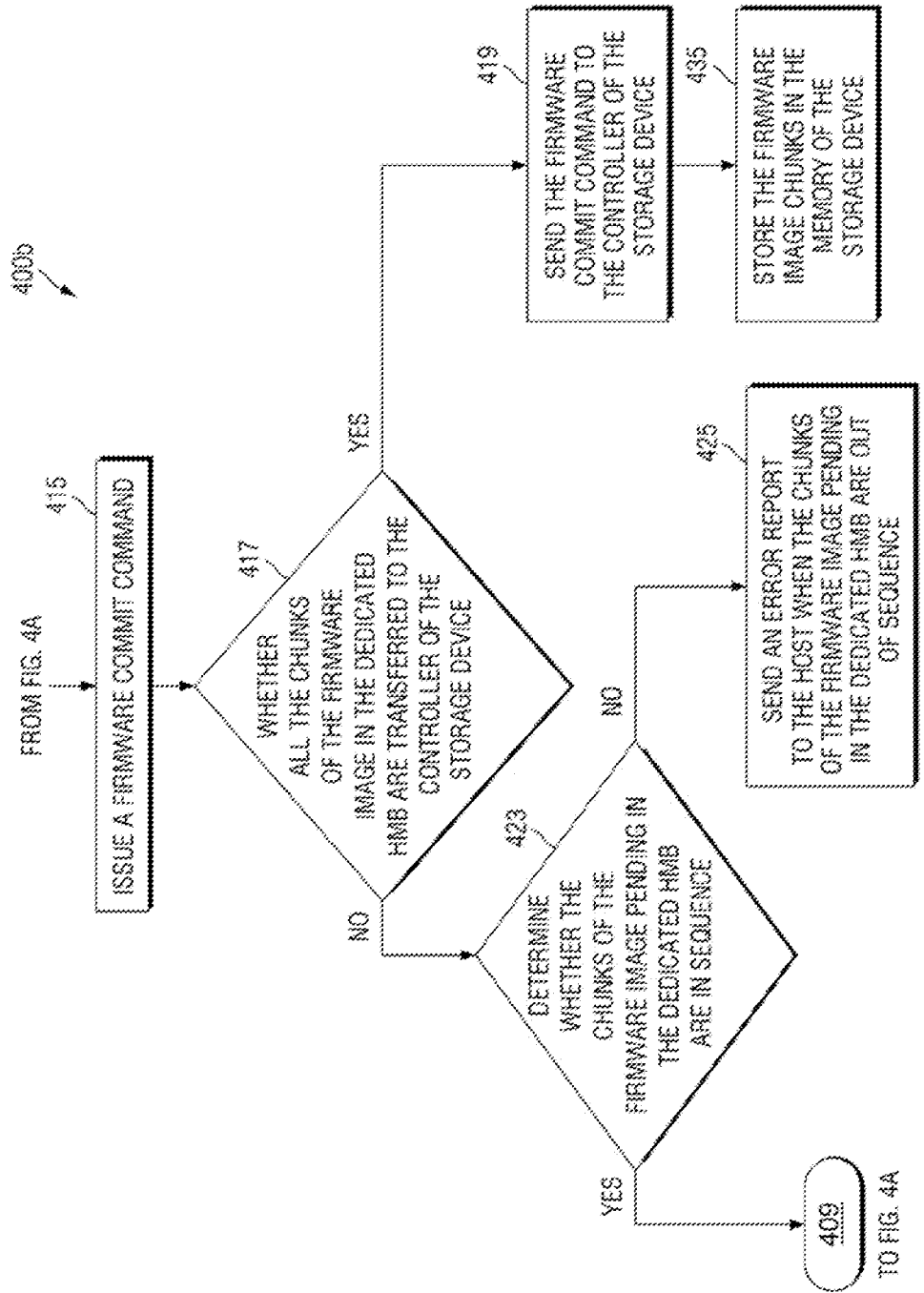

EFFICIENT FIRMWARE DOWNLOAD OPERATION IN STORAGE DEVICES

CROSS REFERENCE TO RELATED APPLICATION

This U.S. non-provisional patent application claims priority under 35 U.S.C. § 119 from Indian Patent Application No. 202241063483, filed on Nov. 7, 2022 in the Indian Intellectual Property Office, the contents of which are herein incorporated by reference in their entirety.

TECHNICAL FIELD

Embodiments of the present disclosure are directed to the field of storage devices, more particularly, but not exclusively, to an efficient firmware download operation in storage devices.

DISCUSSION OF THE RELATED ART

In memory drives with a low on-chip memory, sequential firmware image downloads are directly written to a memory, such as a NAND memory of a storage device, without verification. This process works well when the chunks of a firmware image are in sequence. However, if the chunks of the firmware image are out of sequence, this process results in an error response. Furthermore, with the above-mentioned process, the chunks of the firmware image are first transferred to a buffer of the storage device and retained until a firmware commit command is received by the storage device. This approach blocks the portion of the buffer that contains the chunks of the firmware image until the firmware commit command is received, which leads to an inefficient usage of the buffer.

SUMMARY

An embodiment of the present disclosure provides a method for a firmware image download operation in a storage device. The method comprises storing, by a host, a firmware image in a dedicated host memory buffer (HMB) within a HMB present in the host, and sending, by the host, one or more firmware download commands mapped to the firmware image to a controller of the storage device. Thereafter, the method comprises processing, by the controller, the one or more firmware download commands and identifying an address list mapped to the firmware image and a size of the firmware image. Subsequently, the method comprises sending, by the host, a firmware commit command to the controller of the storage device upon receiving a processing complete status message from the controller, and processing, by the controller, the firmware image from the dedicated HMB upon receiving the firmware commit command. Lastly, the method comprises downloading, by the controller, the firmware image from the dedicated HMB to the storage device after processing the firmware image.

An embodiment of the present disclosure provides a system for a firmware image download operation in a storage device. The system comprising a host, and a controller of the storage device that is communicatively coupled to the host. The host is configured to store a firmware image in a dedicated host memory buffer (HMB) within a HMB present in the host, send one or more firmware download commands mapped to the firmware image to the controller of the storage device, and send a firmware commit command to the controller upon receiving a processing complete status message from the controller. The controller is configured to process the one or more firmware download commands and identify an address list mapped to the firmware image and a size of the firmware image, process the firmware image in the dedicated HMB upon receiving the firmware commit command, and download the firmware image to the storage device from the dedicated HMB upon processing of the firmware image.

Another embodiment of the present disclosure provides a method for a firmware image download operation in a storage device. The method comprises determining, by a driver of a host, whether one or more firmware download commands mapped to chunks of a firmware image stored in the host are in sequence or out of sequence. When the one or more firmware download commands mapped to the chunks of the firmware image are out of sequence, the method comprises allocating, by a controller of the storage device, a dedicated host memory buffer (HMB) within a HMB present in the host upon receiving from the driver of the host a vendor unique (VU) command or a standard command with vendor specific fields. Subsequently, the method comprises processing, by the driver of the host, the one or more firmware download commands and identifying an address list mapped to the chunks of the firmware image and a size of the chunks of the firmware image, and storing, by the driver of the host, the chunks of the firmware image in the dedicated HMB of the host upon processing of the one or more firmware download commands.

Another embodiment of the present disclosure provides a system for a firmware image download operation in a storage device. The system comprises a host that comprises a driver, and a controller of the storage device that is communicatively coupled to the host. The controller is configured to allocate a dedicated host memory buffer (HMB) within a HMB of the host upon receiving from the driver of the host a vendor unique (VU) command or a standard command with vendor specific fields. The driver of the host is configured to determine whether one or more firmware download commands mapped to chunks of a firmware image stored in the host are in sequence or out of sequence. When the one or more firmware download commands mapped to the chunks of the firmware image are out of sequence, the driver of the host is further configured to process the one or more firmware download commands and identify an address list mapped to the chunks of the firmware image and a size of the chunks of the firmware image; and store the chunks of the firmware image in the dedicated HMB of the host after processing the one or more firmware download commands.

BRIEF DESCRIPTION OF THE DRAWINGS

FIGS. 4A-4C are flowcharts of a method for a firmware image download operation in a storage device in accordance with an embodiment of the present disclosure.

DETAILED DESCRIPTION

Figure 1:
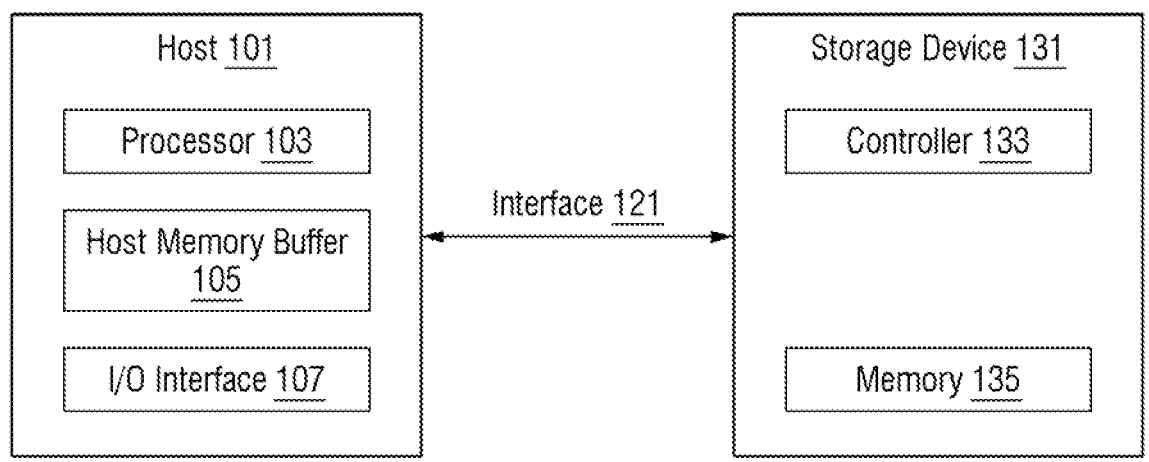
FIG. 1 illustrates a system for a firmware image download operation in a storage device in accordance with an embodiment of the present disclosure.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

In the following detailed description of the embodiments of the disclosure, reference is made to the accompanying drawings that form a part hereof, and in which are shown by way of illustration embodiments in which the disclosure may be practiced. In the figures, the same numbers may be used throughout the figures to reference like features and components.

Embodiments of the present disclosure provide methods and systems for a firmware image download operation in a storage device. In an embodiment, a storage device-based solution is provided, in which a controller of the storage device performs a firmware image download operation in the storage device. In an embodiment, a dedicated host memory buffer (HMB), described below, within a HMB is used to store a firmware image. The validation of the firmware image is performed in the dedicated HMB itself. There is no firmware image (data) transfer on issuance of a firmware download command. The firmware image (data) transfer occurs only on issuance of a firmware commit command. Further, the re-ordering or sorting of an address list mapped to the firmware image that is not in sequence, for example, is out of order, is performed while the firmware image is stored in the dedicated HMB.

In an embodiment, a host-based solution is provided, in which a driver of the host performs a firmware image download operation in the storage device. In an embodiment, a dedicated HMB, described below, within a HMB is used only for those chunks of the firmware image that are not in sequence, for example, are out of order. Further, the re-ordering or sorting of an address list mapped to the firmware image that is not in sequence, for example, is out of order, is performed while the chunks of the firmware image are stored in the dedicated HMB.

FIG. 1 illustrates a system for a firmware image download operation in a storage device in accordance with an embodiment of the present disclosure.

According to an embodiment, a system that performs a firmware image download operation in a storage device includes a host 101, an interface 121 and a storage device 131, as shown in FIG. 1. The host 101 may be referred to as a host central processing unit (CPU). In an embodiment, the host 101 may be a standalone computer or a laptop with a CPU with one or more peripheral component interconnect express (PCIe) slots. The storage device 131 is communicatively coupled to the host 101 through the interface 121, such as a PCIe interface. The storage device 131 may be referred to as a memory device or a PCIe based storage device or a PCIe based non-volatile memory express (NVMe) solid state drive (SSD). The host 101 includes a processor 103, a HMB 105 and an I/O interface 107. The processor 103 includes at least one data processor. The I/O interface 107 includes one or more PCIe slots. The I/O interface 107 communicates command and/or data with the storage device 131 via the interface 121. The command and/or data to be communicated is stored in the HMB 105. The HMB 105 is communicatively coupled to the processor 103 of the host 101. The storage device 131 includes a controller 133 and a memory 135. The controller 133 performs firmware image download operations in the storage device 131. The HMB 105 is a host memory provided for the controller's 133 dedicated use. In an embodiment, the controller 133 is implemented in software. In an embodiment, the controller 133 is implemented as a dedicated hardware unit. As used herein, the term unit may refer to an application specific integrated circuit (ASIC), an electronic circuit, a field-programmable gate array (FPGA), a programmable system-on-chip (PSoC), a combinational logic circuit, and/or other suitable components that provide the described functionality. In an embodiment, the controller 133 is implemented as a combination of software and a dedicated hardware unit. The memory 135 may be, but is not necessarily limited to, NAND SSDs.

Hereafter, an operation/method for a firmware image download operation in the storage device 131 in accordance with an embodiment is described. An embodiment is the storage device 131 based solution, in which the controller 133 performs the firmware image download operation in the storage device 131. The firmware image may be referred to as a firmware file or a firmware binary or a binary. However, embodiments of the present disclosure are not necessarily limited to a firmware image, and other types of files may be considered for download operations in the storage device 131.

Prior to storing a firmware image in a dedicated HMB within the HMB 105, the dedicated HMB needs to be allocated. To request an allocation of the dedicated HMB, the host 101 transmits a request from the host to the controller 133 to allocate the dedicated HMB within the HMB 105 through a vendor unique (VU) command or a standard command with vendor-specific fields on the request. The request may include a memory size required by the host 101 to store a firmware image. Thereafter, upon receiving the request from the host 101, the controller 133 allocates the dedicated HMB within the HMB 105 based on available memory size within the HMB 105. Based on the HMB 105 memory space available to share with the host 105, the controller 133 allocates either a continuous memory or a plurality of scattered HMB 105 chunks in the HMB 105. The size of plurality of HMB 105 chunks sums up to the requested memory size. The allocated continuous memory in the HMB 105 or the allocated plurality of HMB 105 chunks in the HMB 105 may be referred as the dedicated HMB. The controller 133 transmits to the host 101 the addresses related to the continuous memory or to the plurality of HMB 105 chunks. Upon receiving from the controller 133 the addresses related to the continuous memory or to the plurality of HMB 105 chunks, the host 101 stores the firmware image in the dedicated HMB within the HMB 105. The host 101 creates one or more firmware download commands mapped to the dedicated HMB. For example, in an embodiment, when the host 101 receives the addresses related to the continuous memory, the host 101 creates one firmware download command mapped to the dedicated HMB. For example, in an embodiment, when the host 101 receives the addresses related to the plurality of HMB 105 chunks, the host 101 creates more than one firmware download commands, such as one firmware download command for each HMB 105 chunk address and size of HMB 105 chunk, mapped to the dedicated HMB. Subsequently, the host 101 sends to the controller 133 one or more firmware download commands mapped to the firmware image. Thereafter, the controller 133 processes the one or more firmware download commands to identify an address list mapped to the firmware image and a size of the firmware image. In an embodiment, when one or more addresses in the identified address list are not in sequence, the controller 133 sorts the identified address list mapped to the firmware image to be in sequence. On completing the processing of the one or more firmware download commands, the controller 133 sends a processing complete status message to the host 101. Thereafter, upon receiving the processing complete status message from the controller 133, the host 101 sends a firmware commit command to the controller 133. Upon receiving the firmware commit command, the controller 133 processes the firmware image from the dedicated HMB. For example, the controller 133 performs a read operation on the firmware image on receiving the firmware commit command from the dedicated HMB. Subsequently, the controller 133 verifies the validity of the firmware image by performing at least one of a signature verification or a cyclic redundancy check (CRC). After processing the firmware image, the controller 133 downloads the firmware image from the dedicated HMB to the storage device 131. The firmware image is stored in the memory 135 of the storage device 131. After downloading the firmware image to the storage device 131, the controller 133 releases the dedicated HMB to the HMB 105.

Figure 2:
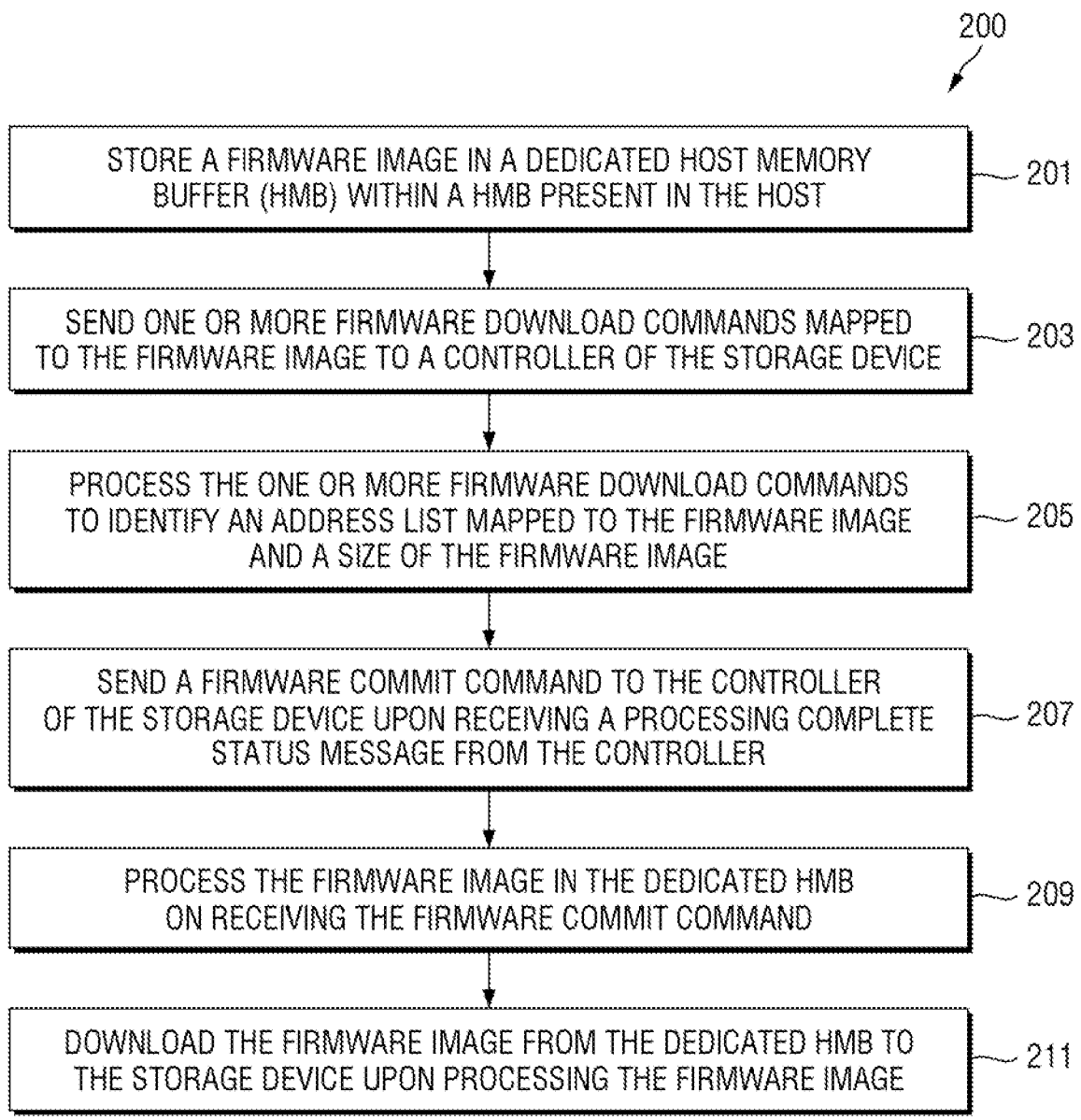
FIG. 2 is a flowchart of a method for a firmware image download operation in a storage device in accordance with an embodiment of the present disclosure.

FIG. 2 is a flowchart of a method for a firmware image download operation in a storage device in accordance with an embodiment of the present disclosure.

In an embodiment, as illustrated in FIG. 2, the method 200 for firmware image download operation in a storage device includes one or more steps, in accordance with an embodiment. The method 200 may be described in the general context of computer executable instructions. In general, computer executable instructions include routines, programs, objects, components, data structures, procedures, modules, and functions that perform particular functions or implement particular abstract data types.

The method illustrated in FIG. 2 can be implemented in any suitable hardware, software, firmware, or combination thereof.

At step 201, the host 101 stores a firmware image in a dedicated HMB within the HMB 105 present in the host 101. The firmware image is stored in a dedicated HMB within the HMB 105 in a contiguous manner or in a scattered manner based on available memory size within the HMB 105. Prior to storing the firmware image in the dedicated HMB within the HMB 105, the host 101 transmits a request to the controller 133 to allocate the dedicated HMB within the HMB 105. The controller 133 allocates the dedicated HMB within the HMB 105 based on available memory size within the HMB 105 through a VU command or through a standard command with vendor-specific fields in the request from the host 101.

At step 203, the host 101 sends to the controller 133 of the storage device 131 one or more firmware download commands mapped to the firmware image.

At step 205, the controller 133 of the storage device 131 processes the one or more firmware download commands to identify an address list mapped to the firmware image and a size of the firmware image.

At step 207, the host 101 sends a firmware commit command to the controller 133 of the storage device 131 upon receiving a processing complete status message from the controller 133.

At step 209, the controller 133 of the storage device 131 processes the firmware image in the dedicated HMB on receiving the firmware commit command. For example, the controller 133 performs a read operation on the firmware image in the dedicated HMB on receiving the firmware commit command and verifies a validity of the firmware image by performing at least one of a signature verification or a CRC.

At step 211, the controller 133 of the storage device 131 downloads the firmware image from the dedicated HMB to the storage device 131 after processing the firmware image.

Figure 3:
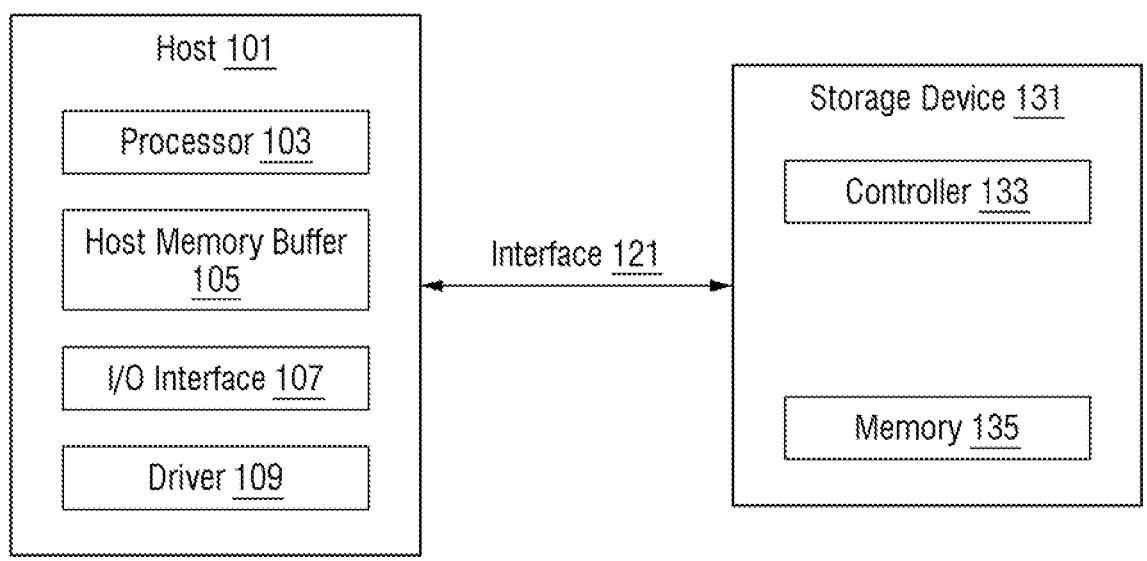
FIG. 3 illustrates a system for a firmware image download operation in a storage device in accordance with an embodiment of the present disclosure.

FIG. 3 illustrates a system for a firmware image download operation in a storage device in accordance with an embodiment of the present disclosure.

According to an embodiment, a system that performs a firmware image download operation in a storage device includes a host 101, an interface 121 and a storage device 131 as shown in FIG. 3. The host 101 may be referred to as a host CPU. In an embodiment, the host 101 may be a standalone computer or a laptop with a CPU with one or more PCIe slots. The storage device 131 is communicatively coupled to the host 101 through the interface 121, such as a PCIe interface. The storage device 131 may be referred to as a memory device or a PCIe based storage device or a PCIe based NVMe SSD. The host 101 includes a processor 103, a HMB 105, an I/O interface 107 and a driver 109. The processor 103 includes at least one data processor. The I/O interface 107 includes one or more PCIe slots. The I/O interface 107 communicates command and/or data with the storage device 131 via the interface 121. The command and/or data to be communicated is stored in the HMB 105. The HMB 105 is communicatively coupled to the processor 103 and the driver 109 of the host 101. The driver 109 of the host 101 performs firmware image download operations in the storage device 131. The storage device 131 includes a controller 133 and a memory 135. The controller 133 assists/supports the driver 109 in performing the firmware image download operations in the storage device 131. The HMB 105 is a host memory given to the controller 133 for its dedicated use. In an embodiment, the controller 133 and the driver 109 are implemented as software. In an embodiment, the controller 133 and the driver 109 are implemented as dedicated hardware units. As used herein, the term unit may refer to an ASIC, an electronic circuit, a FPGA, PSoC, a combinational logic circuit, and/or other suitable components that provide the described functionality. In an embodiment, the controller 133 and the driver 109 are implemented as a combination of software and dedicated hardware units. The memory 135 may be, but is not necessarily limited to, NAND SSDs.

Hereafter, a method for firmware image download operations in the storage device 131 in accordance with an embodiment is described. An embodiment is the host 101 based solution, in which the driver 109 performs the firmware image download operation in the storage device 131. The controller 133 assists/supports the driver 109 in performing the firmware image download operation in the storage device 131. The firmware image may be referred to as a firmware file or a firmware binary or a binary. However, embodiments of the present disclosure are not necessarily limited to a firmware image, and in other embodiments, other types of files can be considered for download operations in the storage device 131.

Prior to determining whether one or more firmware download commands mapped to chunks of the firmware image stored in the host 101 are in sequence or out of sequence, the driver 109 of the host 101 determines whether there are chunks of the firmware image pending in the dedicated HMB that are in sequence. When there are chunks of the firmware image pending in the dedicated HMB that are in sequence, the driver 109 of the host 101 issues one or more firmware download commands or a VU command mapped to the chunks of the firmware image. The driver 109 of the host 101 sends the one or more firmware download commands to the controller 133 of the storage device 131.

Thereafter, the controller 133 of the storage device 131 downloads the chunks of the firmware image associated with the one or more firmware download commands to the storage device 131 from the host 101. Upon downloading of the chunks of the firmware image to the storage device 131, the controller 133 of the storage device 131 sends a completion status message to the host 101. These above operations are performed when there are chunks of the firmware image still pending in the dedicated HMB that are in sequence and at the same time, when one or more new firmware download commands are received by the host 101.

When there are no chunks of the firmware image pending in the dedicated HMB, the driver 109 of the host 101 determines whether one or more firmware download commands mapped to chunks of a firmware image stored in the host 101 are in sequence or out of sequence. When the one or more firmware download commands mapped to the chunks of the firmware image are in sequence, the driver 109 of the host 101 sends the one or more firmware download commands to the controller 133 of the storage device 131. Thereafter, the controller 133 of the storage device 131 downloads from the host 101 to the storage device 131 the in sequence chunks of the firmware image associated with the one or more firmware download commands. Upon downloading of the in sequence chunks of the firmware image to the storage device 131, the controller 133 of the storage device 131 sends a completion status message to the host 101. The above operations of determining whether the one or more firmware download commands mapped to the chunks of the firmware image stored in the host are in or out of sequence and downloading the in sequence chunks of the firmware image when the one or more firmware download commands mapped to the chunks of the firmware image are in sequence, are executed until all of the in sequence chunks of the firmware image are downloaded to the storage device 131. The firmware image is stored in the memory 135 of the storage device 131.

When the one or more firmware download commands mapped to the chunks of the firmware image are out of sequence, a dedicated HMB is allocated within the HMB 105. To request an allocation of the dedicated HMB, the driver 109 of the host 101 transmits a request to the controller 133 to allocate the dedicated HMB within the HMB 105 through a VU command or through a standard command with vendor-specific fields. The request includes a memory size needed by the driver 109 of the host 101 to store the out-of-sequence chunks of the firmware image. Thereafter, upon receiving the VU command or the standard command with vendor specific fields from the driver 109 of the host 101, the controller 133 allocates/configures the dedicated HMB within the HMB 105 in the host 101 based on available memory size within the HMB 105. Based on the HMB 105 memory space available to share with the driver 109, the controller 133 allocates either a continuous memory or a plurality of scattered HMB 105 chunks in the HMB 105. A size of the plurality of HMB 105 chunks sums up to the requested memory size. The allocated continuous memory in the HMB 105 or the allocated plurality of HMB 105 chunks in the HMB 105 may be referred to as the dedicated HMB. The controller 133 transmits the addresses related to the continuous memory or to the plurality of HMB 105 chunks to the driver 109. Thereafter, the driver 109 of the host 101 processes the one or more firmware download commands to identify an address list mapped to the chunks of the firmware image and a size of the chunks of the firmware image. In an embodiment, the host 101 validates the chunks of the firmware image for in-order sequence.

Upon processing the one or more firmware download commands, the driver 109 of the host 101 stores the chunks of the firmware image in the dedicated HMB of the host 101. The above operations of determining whether the one or more firmware download commands mapped to the chunks of the firmware image stored in the host are in or out of sequence and storing the chunks of the firmware image when the one or more firmware download commands mapped to the chunks of the firmware image are out of sequence, are executed until all of the out of sequence chunks of the firmware image are stored to the dedicated HMB. Subsequently, the host 101 issues a firmware commit command. The driver 109 of the host 101 determines whether all of the chunks of the firmware image in the dedicated HMB are transferred to the controller 133 of the storage device 131. If not all of the chunks of the firmware image in the dedicated HMB are transferred to the controller 133 of the storage device 131, the driver 109 of the host 101 determines whether the chunks of the firmware image pending in the dedicated HMB are in sequence. When the chunks of the firmware image pending in the dedicated HMB are out of sequence, the driver 109 of the host 101 sends an error report to the host 101. When the chunks of the firmware image pending in the dedicated HMB are in sequence, the driver 109 of the host 101 issues one or more firmware download commands or the VU command mapped to the chunks of the firmware image. Thereafter, the controller 133 of the storage device 131 downloads from the host 101 the chunks of the firmware image associated with the one or more firmware download commands or VU command in the controller 133 of the storage device 131. Upon downloading the chunks of the firmware image to the controller 133 of the storage device 131, the controller 133 of the storage device 131 sends a completion status message to the host 101. When all of the chunks of the firmware image in the dedicated HMB are transferred to the controller 133 of the storage device 131, the driver 109 of the host 101 sends the firmware commit command to the controller 133 of the storage device 131. Thereafter, the host 101 releases the dedicated HMB to the HMB 105 after downloading the chunks of the firmware image to the storage device 131. The chunks of the firmware image are stored in the memory 135 of the storage device 131.

Figure 4A:
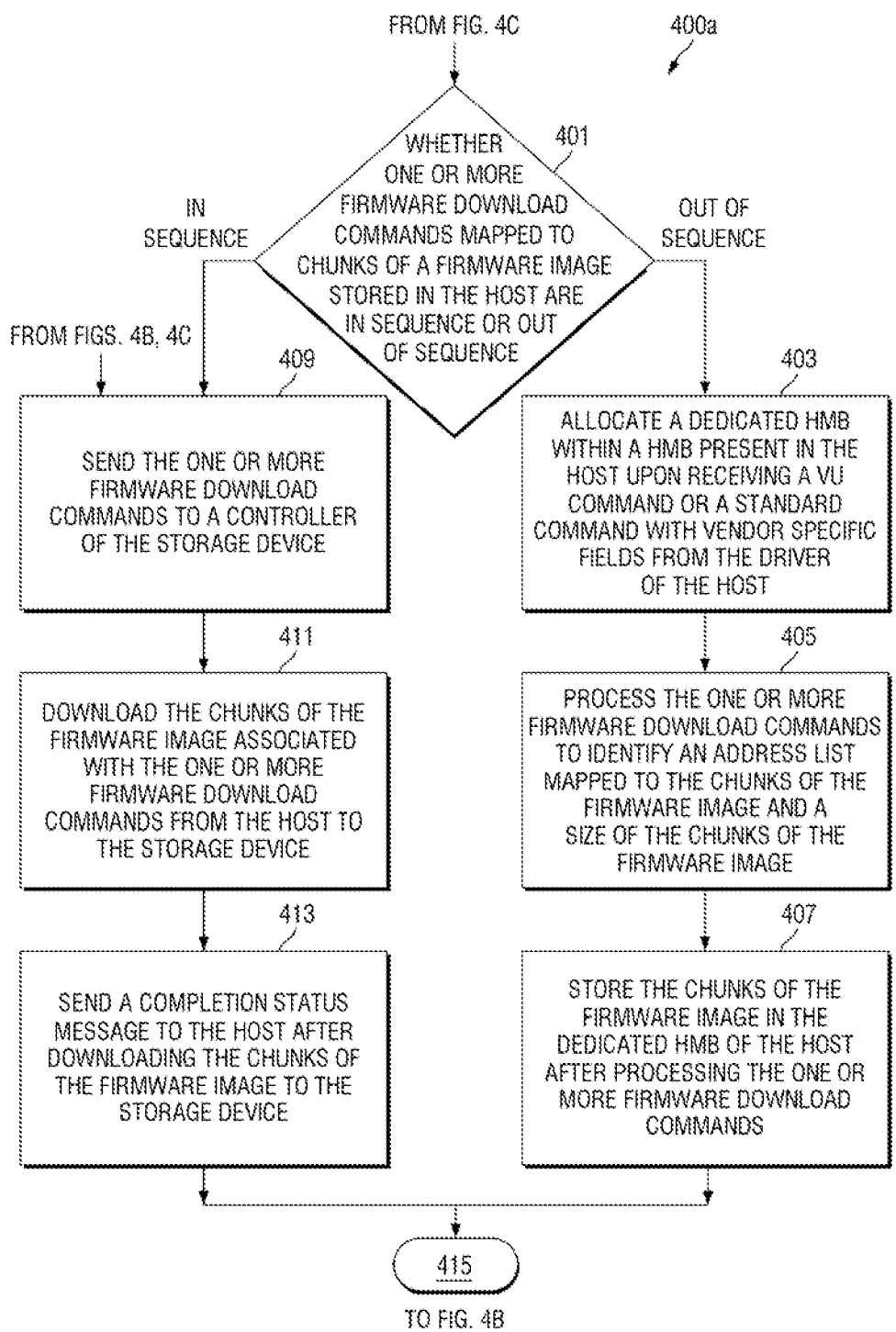
Figure 4C:
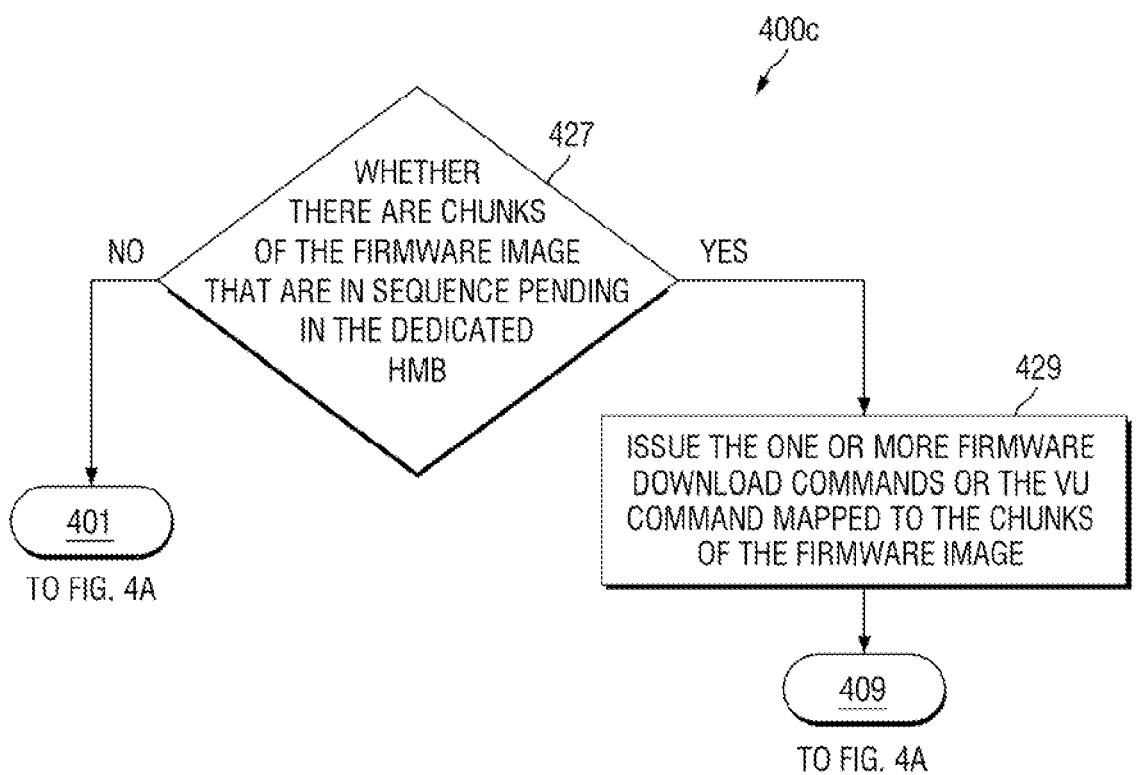

FIGS. 4A-4C are flowcharts of a method for a firmware image download operation in a storage device in accordance with an embodiment of the present disclosure.

According to an embodiment, as illustrated in the FIGS. 4A-4C, the methods 400a, 400b and 400c of a firmware image download operation in a storage device include one or more steps in accordance with an embodiment. The method 400 may be described in the general context of computer executable instructions. In general, computer executable instructions include routines, programs, objects, components, data structures, procedures, modules, and functions that perform particular functions or implement particular abstract data types.

The methods 400a, 400b and 400c can be implemented in any suitable hardware, software, firmware, or combination thereof.

At step 401, the driver 109 of the host 101 determines whether one or more firmware download commands mapped to chunks of a firmware image stored in the host 101 are in sequence or out of sequence.

When the one or more firmware download commands mapped to the chunks of the firmware image are out of sequence, the following operations are performed.

At step 403, the driver 109 of the host 101 allocates a dedicated HMB within the HMB 105 present in the host 101 upon receiving a VU command or a standard command with vendor specific fields from the driver of the host. The controller 133 transmits the addresses related to the continuous memory or to the plurality of HMB 105 chunks to the driver 109.

At step 405, the driver 109 of the host 101 processes the one or more firmware download commands to identify an address list mapped to the chunks of the firmware image and a size of the chunks of the firmware image. In one embodiment, the host 101 validates the chunks of the firmware image for in-order sequence.

At step 407, the driver 109 of the host 101 stores the chunks of the firmware image in the dedicated HMB of the host 101 after processing the one or more firmware download commands.

The steps 401 to 407 of determining whether the one or more firmware download commands mapped to the chunks of the firmware image stored in the host 101 are in sequence or out of sequence, to storing the chunks of the firmware image when the one or more firmware download commands mapped to the chunks of the firmware image are out of sequence are executed until all the out of sequence chunks of the firmware image are stored to the dedicated HMB. Once all the out of sequence chunks of the firmware image are stored in the dedicated HMB, steps from the step 415 onwards (described below) are executed.

When the one or more firmware download commands mapped to the chunks of the firmware image are in sequence, the following operations are performed.

At step 409, the driver 109 of the host 101 sends the one or more firmware download commands to the controller 133 of the storage device 131.

At step 411, the controller 133 of the storage device 131 downloads the chunks of the firmware image associated with the one or more firmware download commands from the host 101 to the storage device 131.

At step 413, the controller 133 of the storage device 131 sends a completion status message to the host 101 after downloading the chunks of the firmware image in the storage device 131.

The steps 401, 409 to 413 of determining whether the one or more firmware download commands mapped to the chunks of the firmware image stored in the host 101 are in sequence or out of sequence, to downloading the chunks to the storage device 131 when the one or more firmware download commands mapped to the chunks of the firmware image are in sequence are executed until all of the in sequence chunks of the firmware image are downloaded to the storage device 131. Once all of the in sequence chunks of the firmware image are downloaded to the storage device 131, steps from the step 415 onwards (described below) are executed.

At step 415, the host 101 issues a firmware commit command.

At step 417, the driver 109 of the host 101 determines whether all of the chunks of the firmware image in the dedicated HMB have been transferred to the controller 133 of the storage device 131.

When all of the chunks of the firmware image in the dedicated HMB have been transferred to the controller 133 of the storage device 131, the following operation is performed.

At step 419, the driver 109 of the host 101 sends the firmware commit command to the controller 133 of the storage device 131.

At step 435, the host 101 releases the dedicated HMB to the HMB 105 after downloading the chunks of the firmware image to the storage device 131. The chunks of the firmware image are stored in the memory 135 of the storage device 131.

When not all the chunks of the firmware image in the dedicated HMB have been transferred to the controller 133 of the storage device 131, the following operations are performed.

At step 423, the driver 109 of the host 101 determines whether the chunks of the firmware image pending in the dedicated HMB are in sequence.

At step 425, the driver 109 of the host 101 sends an error report to the host 101 when the chunks of the firmware image pending in the dedicated HMB are out of sequence.

If, at step 423, it is determined that the chunks of the firmware image pending in the dedicated HMB are in sequence, the driver 109 performs operations from step 409 onwards.

Prior to step 401 of determining whether one or more firmware download commands mapped to the chunks of the firmware image stored in the host 101 are in sequence or out of sequence, the following operations are performed.

At step 427, the driver 109 of the host 101 determines whether there are chunks of the firmware image pending in the dedicated HMB that are in sequence.

When there are chunks of the firmware image pending in the dedicated HMB that are in sequence, the following operations are performed.

At step 429, the driver 109 of the host 101 issues one or more firmware download commands or a VU command mapped to the chunks of the firmware image, and sends the one or more firmware download commands to the controller 133 of the storage device 131.

Thereafter, the driver 109 of the host 101 may perform operations from step 409 onwards when the one or more firmware download commands mapped to the chunks of the firmware image are in sequence.

When there are no chunks of the firmware image pending in the dedicated HMB, the following operations are performed.

At step 401, the driver 109 of the host 101 determines whether the one or more firmware download commands mapped to the chunks of the firmware image stored in the host are in sequence or out of sequence, and performs operations from step 401 onwards.

Embodiments of the present disclosure can handle of out of order firmware image downloads even on a device without a Dynamic Random Access Memory (DRAM) or a device with a small on-chip/on-device buffer memory.

Embodiments of the present disclosure only transfer HMB validated firmware image to storage devices, which eliminates unwanted writes into the storage devices. Consequently, this approach optimizes bandwidth utilization.

Since embodiments of the present disclosure can handle of out of order firmware image downloads even on a device with a small on-chip/on-device buffer memory, this an embodiment can overcome Integrated Circuit (IC) design constraints, which enables technical specification conformance.

There is no data transfer or download of a firmware image to a storage device from a dedicated HMB until a firmware commit command is issued, which results in less storage device overhead when downloading a firmware image.

The present disclosure optimizes use of an on-chip/on-device buffer memory. As a result, a full firmware image need not be maintained at any instant of firmware update process.

A description of an embodiment with several components in communication with each other does not imply that all such components are required.

While various embodiments have been disclosed herein, other embodiments will be apparent to those skilled in the art. The various embodiments disclosed herein are for purposes of illustration and are not intended to be limiting, with the true scope and spirit being indicated by the following claims.

What is claimed is:

1. A method for a firmware image download operation in a storage device, the method comprising:
   determining, by a driver of a host, whether one or more firmware download commands mapped to chunks of a firmware image stored in the host are in sequence or out of sequence;
   performing, by the driver of the host, when the one or more firmware download commands mapped to the chunks of the firmware image are out of sequence:
      allocating, by a controller of the storage device, a dedicated host memory buffer (HMB) within a HMB present in the host upon receiving from the driver of the host a vendor unique (VU) command or a standard command with vendor specific fields;
      processing, by the driver of the host, the one or more firmware download commands and identifying an address list mapped to the chunks of the firmware image and a size of the chunks of the firmware image; and
      storing, by the driver of the host, the chunks of the firmware image in the dedicated HMB of the host upon processing the one or more firmware download commands,
      issuing, by the host, a firmware commit command;
   determining, by the driver of the host, whether all the chunks of the firmware image in the dedicated HMB are transferred to the controller of the storage device;
   when all the chunks of the firmware image in the dedicated HMB are transferred to the controller of the storage device, sending, by the driver of the host, the firmware commit command to the controller of the storage device; and
   when not all of the chunks of the firmware image in the dedicated HMB have been transferred to the controller of the storage device,
      determining, by the driver of the host, whether the chunks of the firmware image pending in the dedicated HMB are in sequence; and
      sending, by driver of the host, an error report to the host when the chunks of the firmware image pending in the dedicated HMB are out of sequence.

2. The method as claimed in claim 1, wherein determining whether the one or more firmware download commands mapped to the chunks of the firmware image stored in the host are in sequence or out of sequence, allocating a dedicated host memory buffer (HMB) within a HMB present in the host, processing the one or more firmware download commands and storing the chunks of the firmware image in the dedicated HMB of the host are executed until all of the out of sequence chunks of the firmware image are stored to the dedicated HMB.

3. The method as claimed in claim 1, wherein prior to determining whether one or more firmware download commands mapped to the chunks of the firmware image stored in the host are in sequence or out of sequence, the method comprises:
   determining, by the driver of the host, whether there are chunks of the firmware image that are in sequence pending in the dedicated HMB;
   when there are chunks of the firmware image that are in sequence pending in the dedicated HMB,
      issuing, by the driver of the host, the one or more firmware download commands or the VU command mapped to the chunks of the firmware image;
      sending, by the driver of the host, the one or more firmware download commands to the controller of the storage device;
      downloading, by the controller of the storage device, the chunks of the firmware image associated with the one or more firmware download commands from the host to the storage device; and
      sending, by the controller of the storage device, a completion status message to the host after downloading the chunks of the firmware image to the storage device, and
   when there are no chunks of the firmware image pending in the dedicated HMB,
      determining, by the driver of the host, whether the one or more firmware download commands mapped to the chunks of the firmware image stored in the host are in sequence or out of sequence.

4. The method as claimed in claim 1, wherein processing the one or more firmware download commands further comprises:
   validating, by the host, the chunks of the firmware image for in-order sequence.

5. The method as claimed in claim 1, further comprising:
   when the one or more firmware download commands mapped to the chunks of the firmware image are in sequence:
      sending, by the driver of the host, the one or more firmware download commands to the controller of the storage device;
      downloading, by the controller of the storage device, the chunks of the firmware image associated with the one or more firmware download commands from the host to the storage device; and
      sending, by the controller of the storage device, a completion status message to the host after downloading the chunks of the firmware image to the storage device.

6. The method as claimed in claim 5, wherein determining whether the one or more firmware download commands mapped to the chunks of the firmware image stored in the host are in sequence or out of sequence, when the one or more firmware download commands mapped to the chunks of the firmware image are in sequence, sending, by the driver of the host, the one or more firmware download commands to the controller of the storage device; downloading, by the controller of the storage device, the chunks of the firmware image associated with the one or more firmware download commands from the host to the storage device; and sending, by the controller of the storage device, a completion status message to the host after downloading the chunks of the firmware image to the storage device, are executed until all of the in sequence chunks of the firmware image have been downloaded to the storage device.

7. The method as claimed in claim 5, further comprising:
releasing, by the host, the dedicated HMB to the HMB after downloading the chunks of the firmware image to the storage device.

8. The method as claimed in claim 1, further comprising:
releasing, by the host, the dedicated HMB to the HMB after downloading the chunks of the firmware image to the storage device.

9. A system for a firmware image download operation in a storage device, the system comprising:
a host that comprises a driver; and
a controller of the storage device that is communicatively coupled to the host,
wherein the controller is configured to:
allocate a dedicated host memory buffer (HMB) within a HMB of the host upon receiving from the driver of the host a vendor unique (VU) command or a standard command with vendor specific fields, and
wherein the driver of the host is configured to:
determine whether one or more firmware download commands mapped to chunks of a firmware image stored in the host are in sequence or out of sequence;
when the one or more firmware download commands mapped to the chunks of the firmware image are out of sequence,
process the one or more firmware download commands and identify an address list mapped to the chunks of the firmware image and a size of the chunks of the firmware image; and
store the chunks of the firmware image in the dedicated HMB of the host after processing the one or more firmware download commands,
issue a firmware commit command;
determine whether all the chunks of the firmware image in the dedicated HMB are transferred to the controller of the storage device;
when all the chunks of the firmware image in the dedicated HMB are transferred to the controller of the storage device, send the firmware commit command to the controller of the storage device;
when not all of the chunks of the firmware image in the dedicated HMB have been transferred to the controller of the storage device, determine whether the chunks of the firmware image pending in the dedicated HMB are in sequence; and
send an error report to the host when the chunks of the firmware image pending in the dedicated HMB are out of sequence.

* * * * *